US 6,661,647 B2

(12) United States Patent
Kirchhevel et al.

(10) Patent No.: US 6,661,647 B2
(45) Date of Patent: Dec. 9, 2003

(54) SNAP-IN DISPLAY FRAME

(75) Inventors: G. Lamar Kirchhevel, Goshen, IN (US); Michael K. Brown, Elkhart, IN (US)

(73) Assignee: Bayer Corporation, Elkhart, IN (US)

( * ) Notice: Subject to any disclaimer, the term of this patent is extended or adjusted under 35 U.S.C. 154(b) by 0 days.

(21) Appl. No.: 10/202,977

(22) Filed: Jul. 26, 2002

(65) Prior Publication Data

US 2003/0030973 A1 Feb. 13, 2003

Related U.S. Application Data

(60) Provisional application No. 60/311,944, filed on Aug. 13, 2001.

(51) Int. Cl.[7] .................................................. G06F 1/16
(52) U.S. Cl. ........................ 361/681; 361/679; 349/63; 248/920; 400/680
(58) Field of Search ................................. 361/681, 679, 361/685, 683; 349/58–59, 62–63, 67, 150; 248/917–924; 400/83, 88, 680–682

(56) References Cited

U.S. PATENT DOCUMENTS

| 5,268,816 A | * 12/1993 | Abell, Jr. et al. ............ 361/681 |
| 5,575,403 A | 11/1996 | Charlton et al. |
| 5,630,986 A | 5/1997 | Charlton et al. |
| 6,421,231 B1 | * 7/2002 | Jung .......................... 361/681 |
| 6,488,517 B1 | * 12/2002 | Williams et al. ............ 439/165 |
| 6,504,586 B1 | * 1/2003 | Lee .............................. 349/58 |

* cited by examiner

Primary Examiner—Darren Schuberg
Assistant Examiner—Hung Van Duong
(74) Attorney, Agent, or Firm—Jerome L. Jeffers

(57) ABSTRACT

An apparatus (26) for mounting a display screen (28) to a printed circuit board (32). The display screen (28) has four edges. The apparatus (26) includes a top member (34) opposed to a bottom member (36), and first and second snap-fit members (40). The top member (34) and the bottom member (36) each form an overhang (38), wherein each overhang (38) is adapted to receive an edge (30) of the display screen (28). The first snap-fit member (40) is connected with and extended outwards from the top member (34). The second snap-fit member (40) is also connected with and extended outwards from the bottom member (36). Both the first and the second snap-fit members (40) are adapted to connect with the printed circuit board (32) for snap-fit assembly of the mounting apparatus (26) to the printed circuit board (32).

20 Claims, 4 Drawing Sheets

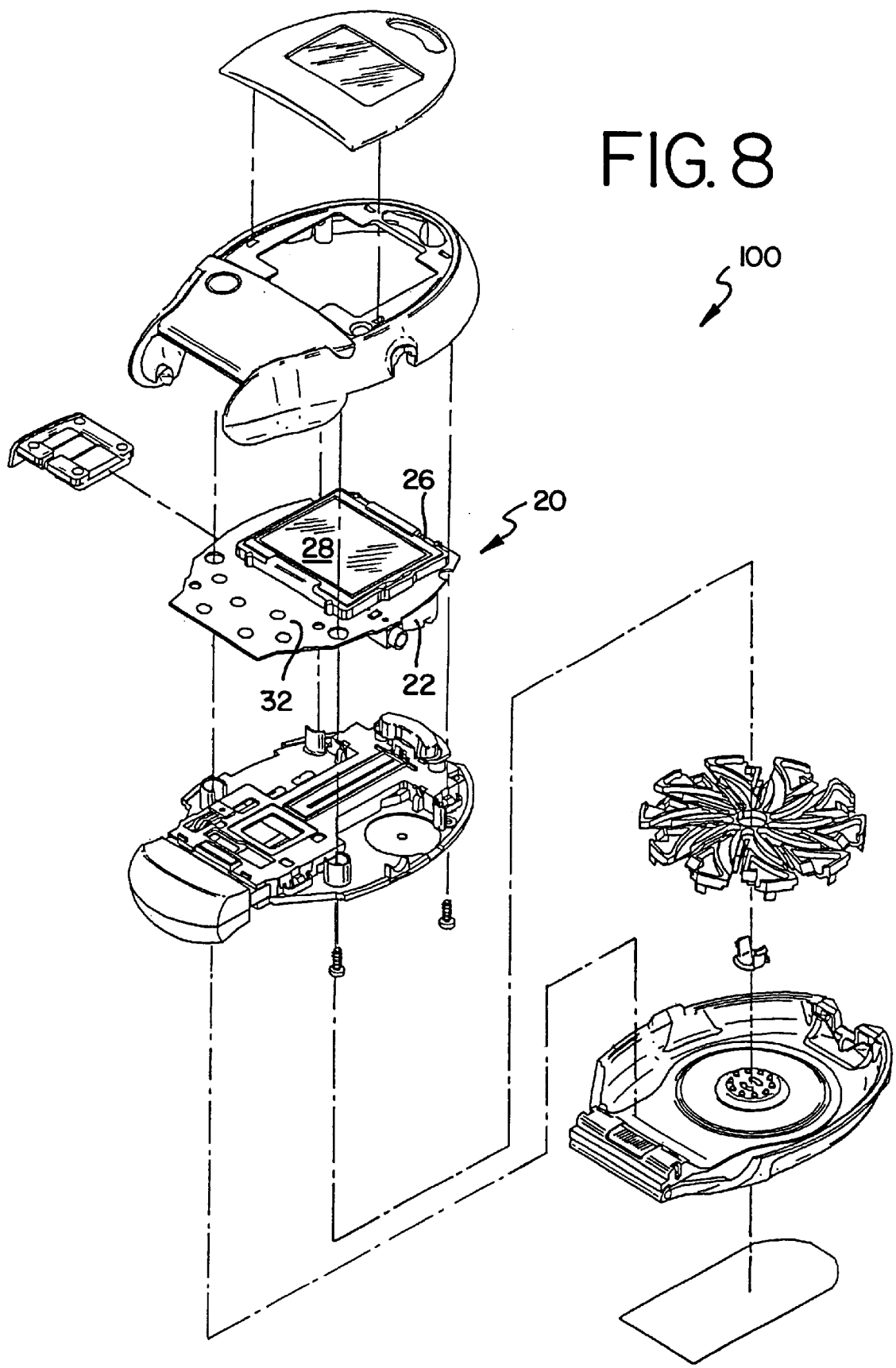

SNAP-IN DISPLAY FRAME

This application claims the benefit of provisional application No. 60/311,944 filed Aug. 13, 2001.

FIELD OF THE INVENTION

This invention relates, in general, to an electronic package assembly and, more particularly, to a mounting apparatus for mounting a display screen to a printed circuit board, wherein the mounting apparatus includes a snap-fit connector.

BACKGROUND OF THE INVENTION

Printed circuit boards have numerous electronic components mounted to them, such as resistors, capacitors, and microchips. Sometimes, in order to ease the installation of these electronic components onto the printed circuit board, an electronic package assembly is manufactured which houses the electronic component. The electronic package assembly is then used to mount the electronic component onto the printed circuit board. A specific example of such a packaged electronic component is an accelerometer, which may, for example, be mounted on a printed circuit board used in automobiles to activate an airbag, for instance.

Another example of a packaged electronic component is a display screen for viewing information, which may, for example, be mounted to a printed circuit board for use in such things as automobiles, airplanes, hand-held devices, laptop computers, and to any electronic devices, for example. As defined herein, a display screen is any device which may be used to view non-static, or changing, information known to those skilled in the art, such as, for example, a liquid crystal display, a plasma screen, or a cathode ray tube. Additionally, as defined herein, a hand-held device is any device which is portable and may be held in one's hands, such as but not limited to, a portable computer, a glucose meter, a GPS unit, a telephone, and a personal digital assistant (PDA).

Typically, display screens are mounted to a printed circuit board using one of the following conventional methods: screw-type fasteners and metal compression frames, metal compression frames with bend tabs, pins soldered to the display screen and then soldered to the printed circuit board, heat seal flex circuits attached to a display screen and then heat sealed or soldered to a printed circuit board. If a compression frame is used, the display screen must be secured to the compression frame, and then the compression frame must be attached to the printed circuit board by either fastening the compression frame to the printed circuit board with metal screws, or by inserting the metal compression frame through the printed circuit board and then bending the bend tabs. Furthermore, most methods employ a separate location bezel between the printed circuit board and the display screen to precisely locate the display screen in the X, Y and Z axes.

Installing a display screen onto a printed circuit board using the above disclosed electronic package assembly is not a simple task and can be rather cumbersome. For example, connecting the display screen to the printed circuit board using the compression frame requires a substantial amount of time and labor, in addition to the high cost for parts. Additionally, using the compression frame introduces variability in assembly quality, such as the amount of torque used to tighten the screws, and the exact placement of the display screen. Accordingly, further development of electronic package assemblies, and in particular mounting apparatus for mounting electrical components such as display screens to printed circuit boards is necessary to save time and labor during the installation of these electronic components.

SUMMARY

The present invention is defined by the following claims, and nothing in this section should be taken as a limitation on those claims. By way of introduction, the preferred embodiments described below relate to an apparatus for mounting a display screen to a printed circuit board. The display screen has four edges. The apparatus includes a top member opposed to a bottom member, and first and second snap-fit members. The top member and the bottom member each forming an overhang, wherein each overhang is adapted to receive an edge of the display screen. The first snap-fit member is connected with and extended outwards from the top member. The second snap-fit member is also connected with and extended outwards from the bottom member. Both the first and the second snap-fit members are adapted to connect with the printed circuit board for snap-fit assembly of the mounting apparatus to the printed circuit board.

The preferred embodiments further relate to an electronic sub-assembly. The electronic sub-assembly comprises a display screen, a printed circuit board, and a mounting apparatus. The mounting apparatus comprises a top member opposed to a bottom member, wherein the top member and the bottom member each forming an overhang, and wherein each overhang receives an edge of the display screen. The mounting apparatus also comprises a first snap-fit member connected with and extending outwards from the top member, and a second snap-fit member connected with and extending outwards from the bottom member. The first and second snap-fit members are connected with the printed circuit board. Further aspects and advantages of the invention are discussed below in conjunction with the preferred embodiments.

BRIEF DESCRIPTION OF SEVERAL VIEWS OF THE DRAWINGS

FIG. 8 is an exploded top perspective view of the electronic subassembly shown in FIG. 1 mounted within a glucose meter, according to one preferred embodiment.

Figure 1:
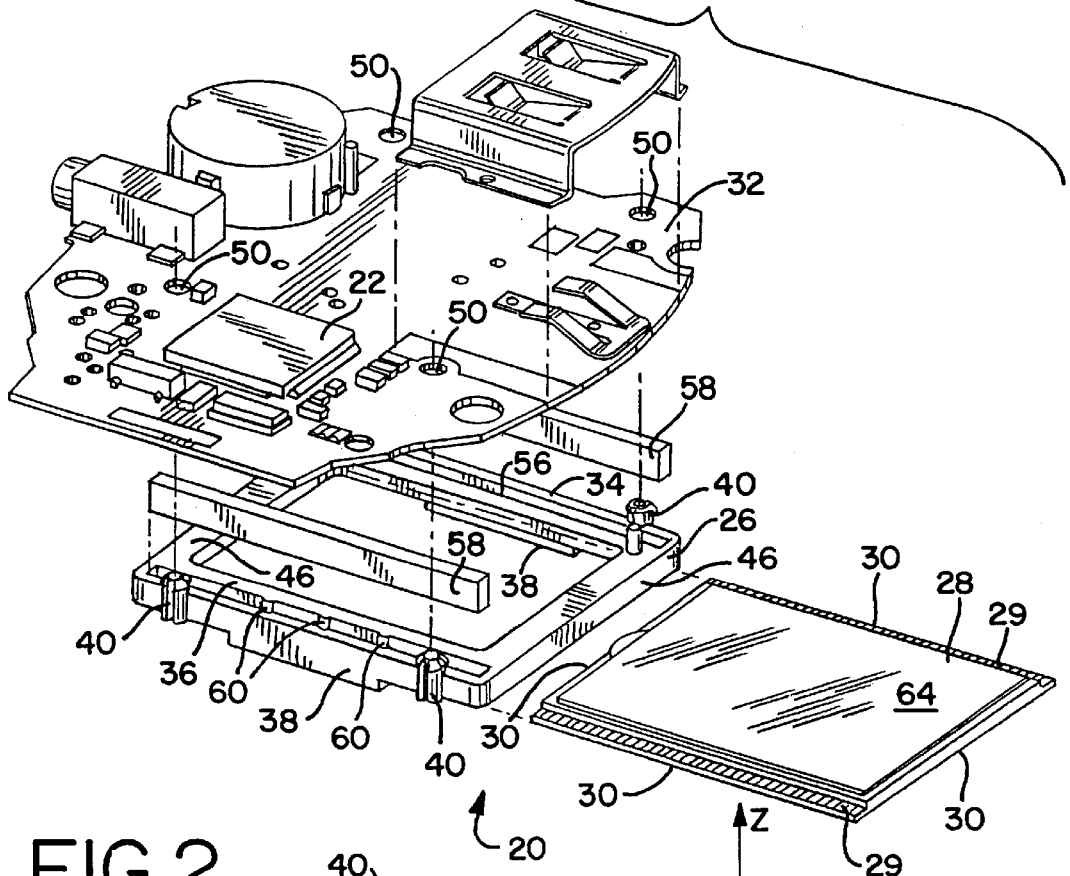
FIG. 1 is an exploded bottom perspective view of an electronic sub-assembly having a mounting apparatus for mounting a display screen to a printed circuit board, according to one preferred embodiment.

It will be appreciated that for simplicity and clarity of illustration, elements shown in the figures have not necessarily been drawn to scale. For example, dimensions of some elements are exaggerated relative to each other. Further, where considered appropriate, reference numerals have been repeated among the figures to indicate corresponding elements.

DETAILED DESCRIPTION OF THE PRESENTLY PREFERRED EMBODIMENTS

In view of the above limitations of existing mounting apparatus, it is an aspect of the present invention to provide an apparatus for more easily and more precisely mounting a display screen to a printed circuit board. Shown in FIG. 1 is an exploded perspective view of an electronic sub-assembly 20 having a printed circuit board 32, a display screen 28, and a mounting apparatus 26 for mounting the display screen 28 to the printed circuit board 32. The printed circuit board 32 may be any printed circuit board known to those skilled in the art which may be used for mounting electronic components 22. Preferably, the printed circuit board 32 is manufactured from materials such as: epoxy glass, FR4, and polyamide. The printed circuit board 32 has a number of electronic components 22 mounted on the surface of printed circuit board 32. These electronic components 22 are electrically connected to each other through a number of lands (not shown) and traces (not shown) printed on the surface and the internal layers of the printed circuit board 32. The electronic components 22 can include any electronic component known to those skilled in the art, such as, for example, a battery, a capacitor, a resistor, a semiconductor chip, a diode, an inductor, and a coil. Preferably, the printed circuit board 32 forms first and second mating holes 50 for receiving first and second snap-fit members 40, as described below.

Figure 2:
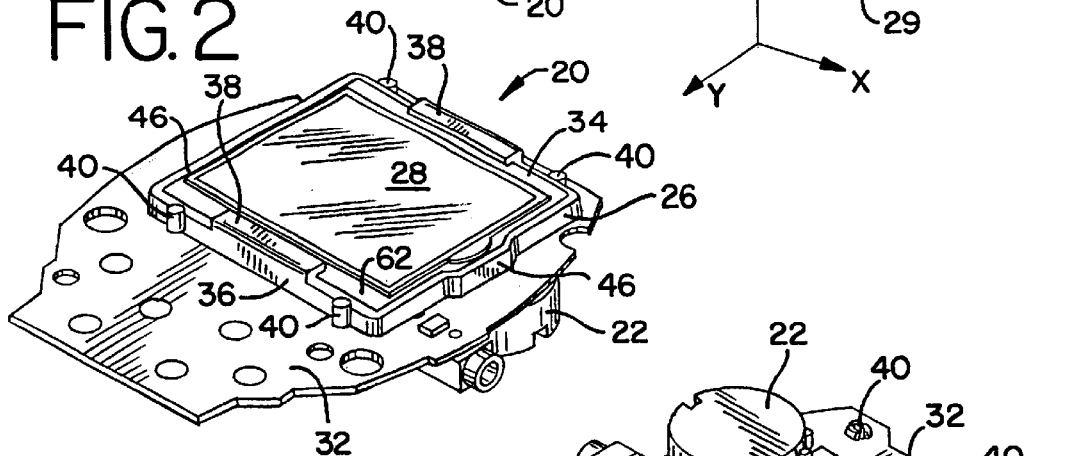
FIG. 2 is an assembled top perspective view of the electronic sub-assembly shown in FIG. 1, according to one preferred embodiment.
Figure 6:
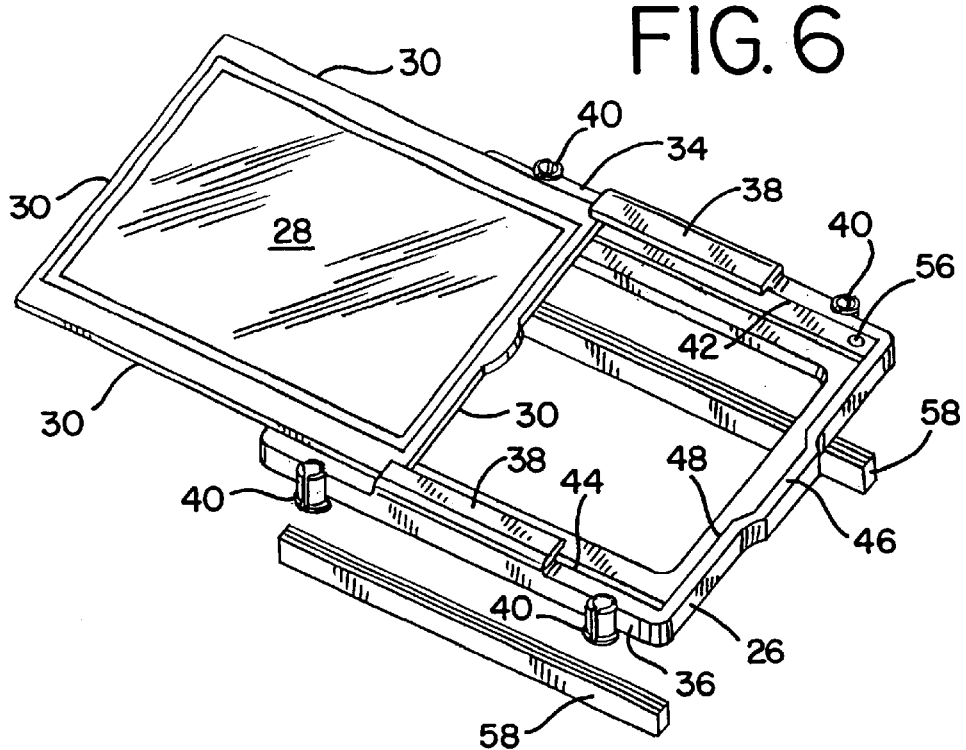
FIG. 6 is an exploded top perspective view of a portion of the electronic sub-assembly shown in FIG. 1, according to one preferred embodiment.

The display screen 28 has contacts 29 and four edges 30, as illustrated in FIGS. 1 and 6. The display screen 28 is any device which may be used to view non-static, or changing, information known to those skilled in the art, such as, for example, a liquid crystal display, a plasma screen, or a cathode ray tube. The contacts 29, through elastomeric connectors 58, electrically connect the display screen 28 to the printed circuit board 32, as described below. The display screen 28 includes a top side 62 opposed to a bottom side 64, as illustrated in FIGS. 1–2. The contacts 29 are disposed along at least one edge 30 of the bottom side 64, as illustrated in FIG. 1. In one embodiment, the contacts are disposed along two edges 30 of the bottom side 64.

Figure 3:
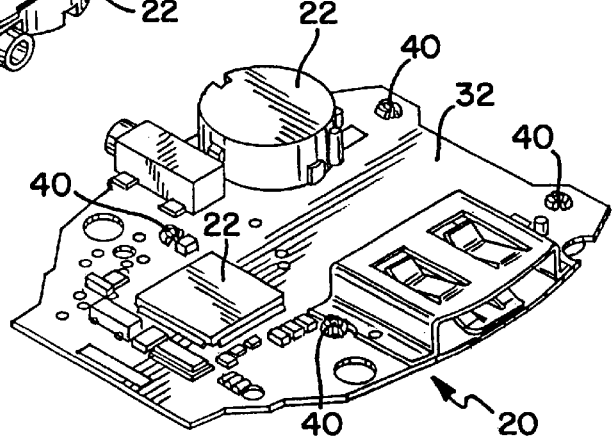
FIG. 3 is an assembled bottom perspective view of the electronic sub-assembly shown in FIG. 1, according to one preferred embodiment.

The mounting apparatus 26 mounts the display screen 28 to the printed circuit board 32, as illustrated in FIGS. 1–3. The mounting apparatus 26 includes a top member 34 opposed to a bottom member 36, a first snap fit member 40, and a second snap fit member 40. The mounting apparatus 26 is made of any material that is rigid enough to form elements such as the top member 34 and the bottom member 36. In one preferred embodiment, the mounting apparatus 26 is made of rigid materials, such as, for example, metals such as steel, aluminum, and brass, and plastics such as, Ethylene-vinyl acetate, Acrylics such as Acrylonitrile-butadiene-styrene and Acrylic-styrene-acrylonitrile, and Polymers such as Polycarbonate, Polyurethane, Polythylene, Polybutylene, Polyvinyl chloride, Polyphenylene oxide, Chlorinated polyvinyl chloride, Polyamides, and Polybutylene terephthalate. Mounting apparatus 26 may be formed using any technique known to one of ordinary skill, such as die casting, injection molding, or brazing. The top member 34 and the bottom member 36 each form an overhang 38, wherein each overhang 38 is adapted to receive one edge 30 of the display screen 28. Preferably each overhang 38 is disposed so as to come into contact, or at least face, the top side 62 of the display screen 28, as illustrated in FIG. 2. The overhangs 38 prevents the display screen 28 from moving in a direction away from the surface of the printed circuit board 32. More specifically, the overhangs 38 prevent the display screen 28 from moving in a direction along the Z-axis, as illustrated in FIG. 1.

As shown in FIG. 6, the top member 34 forms a top sidewall 42, wherein the top sidewall 42 abuts against a first edge 30 of the display screen 28 when the display screen 28 is received by the mounting apparatus 26. Additionally, the bottom member 36 forms a bottom sidewall 44, wherein the bottom sidewall 44 abuts against a second edge 30 of the display screen 28 when the display screen 28 is received by the mounting apparatus 26. The top sidewall 42, in conjunction with the bottom sidewall 44, prevents the display screen 28 from moving in a direction along the surface of the printed circuit board 32. More specifically, the top sidewall 42, in conjunction with the bottom sidewall 44, prevents the display screen 28 from moving in a direction along the Y-axis, as illustrated in FIG. 1.

In one preferred embodiment, the top member 34 and the bottom member 36 each have a connector slot 56, wherein each connector slot 56 is adapted to receive an elastomeric connector 58, as shown in FIG. 1. The elastomeric connectors 58 electrically connect the display screen 28, and more specifically the contacts 29, to the printed circuit board 32. The elastomeric connectors 28 generally comprise alternating layers of flexible conductive and insulating materials so as to create a somewhat flexible electrical connector. In one preferred embodiment, the connector slots 56 contain a plurality of slot bumps 60 that engage the sides of the elastomeric connectors 58 to prevent the elastomeric connectors 58 from falling out of the connector slots 56 during assembly, as illustrated in FIG. 1.

In one preferred embodiment, the mounting apparatus 26 includes a connecting member 46 connected with the top member 34 and the bottom member 36. Preferably, the mounting apparatus 26 includes two connecting members 46 connected with the top member 34 and the bottom member 36, as illustrated in FIG. 1. More preferably, one connecting member 46 connects a first end of the top member 34 to a first end of the bottom member 36, and another connecting member 46 connects a second end of the top member 34 to a second end of the bottom member 36, as illustrated in FIGS. 1 and 2. The connecting member 46 joins the top member 34 to the bottom member 36, so that the distance between the top member 34 and the bottom member 36 remains relatively constant. Preferably, connecting member 46 is made of rigid materials, such as, for example, metals such as steel, aluminum, and brass, and plastics such as, Ethylene-vinyl acetate, Acrylics such as Acrylonitrile-butadiene-styrene and Acrylic-styrene-acrylonitrile, and Polymers such as Polycarbonate, Polyurethane, Polythylene, Polybutylene, Polyvinyl chloride, Polyphenylene oxide, Chlorinated polyvinyl chloride, Polyamides, and Polybutylene terephthalate.

The connecting member 46 forms a connecting sidewall 48, wherein the connecting sidewall 48 abuts against a third edge 30 of the display screen 28 when the display screen 28 is received by the mounting apparatus 26, as illustrated in FIGS. 2 and 6. The connecting sidewall 48 prevents the display screen 28 from moving in a direction along the surface of the printed circuit board 32. More specifically, the connecting sidewall 48 prevents the display screen 28 from moving in a direction along the X-axis, as illustrated in FIG. 1.

Preferably, the top member 34, the bottom member 36, and the connecting member 46 are all integrally formed as one piece, as illustrated in FIGS. 1–2, however, the top member 34, the bottom member 36, and the connecting member 46 may be separately formed and then later attached to or connected with one another. Whichever way the top member 34, the bottom member 36, and the connecting member 46 are formed, eventually the top member 34, the bottom member 36, and the connecting member 46 are all integrated into one single unit.

Figure 4:
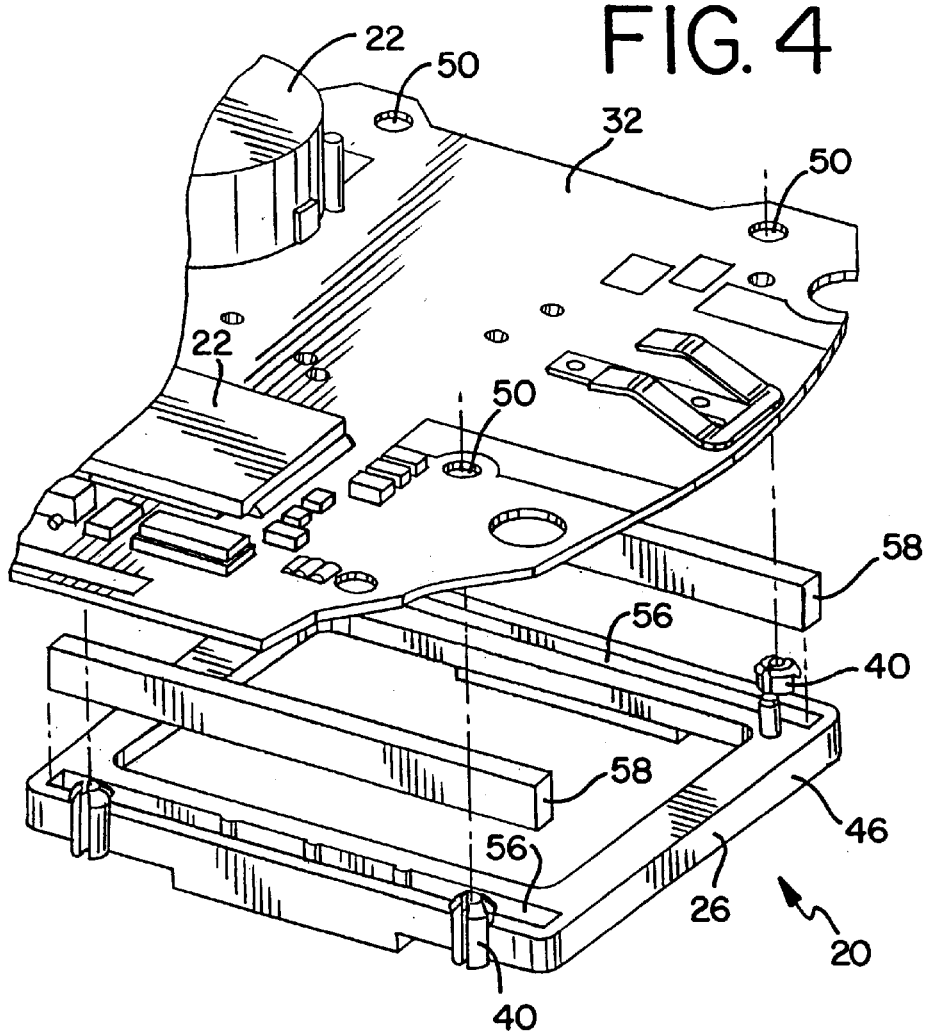
FIG. 4 is an enlarged bottom perspective view of a portion of the electronic sub-assembly shown in FIG. 1, according to one preferred embodiment.
Figure 5:
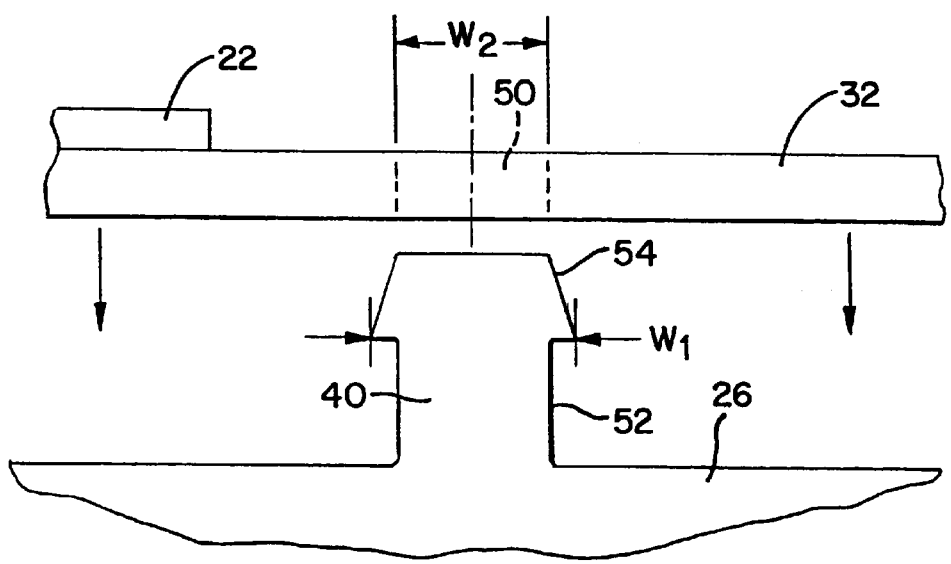
FIG. 5 is an enlarged side view of a portion of the electronic sub-assembly shown in FIG. 1, according to one preferred embodiment.

The first snap-fit member 40 is connected with and extended outwards from the top member 34, as illustrated in FIGS. 1 and 4. Preferably, at least two snap-fit members 40 are connected with and extended outwards from the top member 34. Additionally, the second snap-fit member 40 is connected with and extended outwards from the bottom member 36, as illustrated in FIGS. 1 and 4. Preferably, at least two snap-fit members 40 are connected with and extended outwards from the bottom member 36. The first and second snap-fit members 40 are adapted to connect with the printed circuit board 32 for snap-fit assembly of the mounting apparatus to the printed circuit board, as illustrated in FIGS. 1–4. More preferably, the first and second snap-fit members 40 are adapted to connect with mating holes 50 formed by the printed circuit board 32. Each snap-fit member 40 comprises a flange 52 which extends outwards from a portion of the mounting apparatus 26, such as the top member 34 or the bottom member 36, and a head 54 connected to the flange 52. Preferably, the head 54 has a maximum width $W_1$ which is greater than the maximum width $W_2$ of the mating hole 50 that the snap-fit member 40 is adapted to connect with, as illustrated in FIG. 5.

Figure 7:
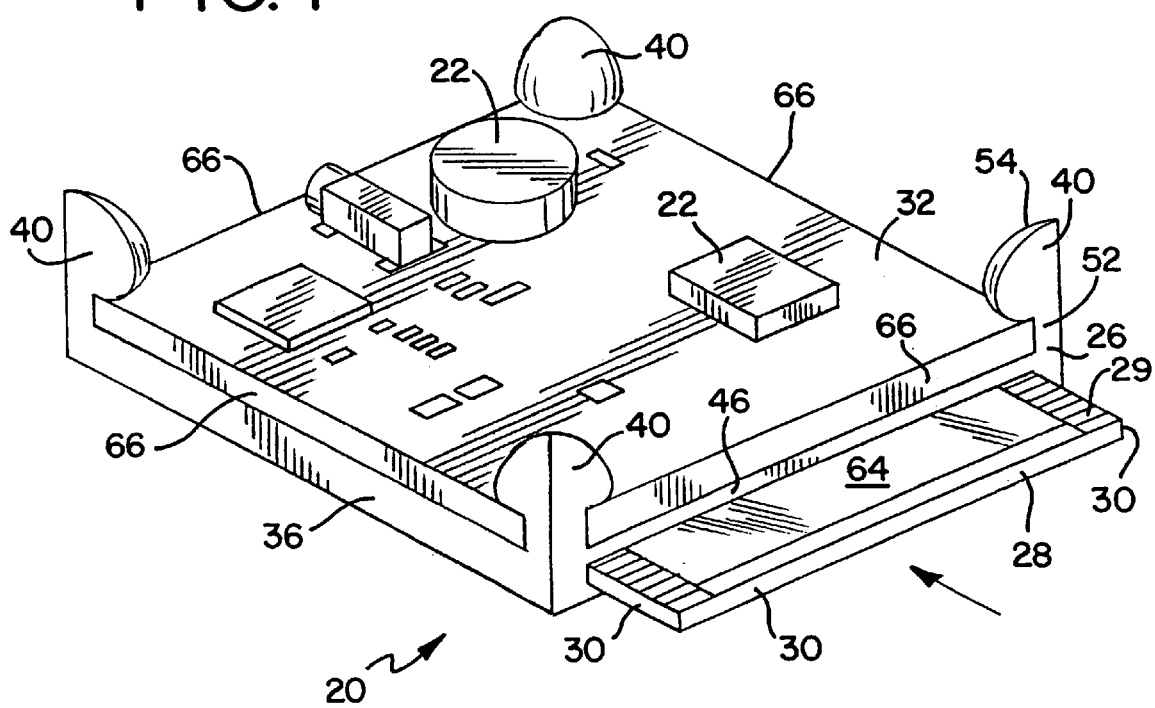
FIG. 7 is an assembled bottom perspective view of an electronic sub-assembly having a mounting apparatus for mounting a display screen to a printed circuit board, according to one preferred embodiment.

In one embodiment, the first and second snap-fit members 40 are adapted to connect with an edge 66 of the printed circuit board 32, as illustrated in FIG. 7. If the first and second snap-fit members 40 are adapted to connect with an edge 66 of the printed circuit board 32, the printed circuit board 32 does not need to form mating holes 50.

The electronics sub-assembly 20 may be used in many devices, such as automobiles, airplanes, hand-held devices, computer equipment, electronic medical devices and any electronic components that include a display screen, for example. In one preferred embodiment, as illustrated in FIG. 8, the electronics sub-assembly 20 is used in a hand-held device, and more specifically, in a blood glucose instrument 100, an example of which is described in greater detail in U.S. patent application Ser. No. 10/207,596, filed Jul. 25, 2002, and titled "Blood Glucose Sensor Dispensing Instrument Having A Pull/Push Activation Mechanism", the entire disclosure of which is incorporated herein by reference. By using a modular design for building the blood glucose sensor dispensing instrument 100, the electronics sub-assembly 20 can be tested before assembly into the blood glucose sensor dispensing instrument 100.

The electronic sub-assembly 20 is assembled by attaching the display screen 28 to the mounting apparatus 26, wherein the edges 30 of the display screen 28 are received by the overhangs 38. Additionally, elastomeric connectors 58 are inserted into connector slots 56 before the mounting apparatus 26 is attached to the printed circuit board 32. The mounting apparatus 26 is then attached to the printed circuit board 32 with the snap-fit members 40, as illustrated in FIG. 1. Preferably, the snap-fit members 40 are pushed through mating holes 50 formed on the printed circuit board 32. Once the snap-fit members 40, and more particularly, the heads 54 of the snap-fit members 40 are pushed through the mating holes 50, the mounting apparatus 26 is then securely attached to the printed circuit board 32, and the elastomeric connectors 58 are electrically connected to the printed circuit board 32 and the display screen 28.

In one embodiment the mounting apparatus 26 is sufficiently flexible to allow the display screen 28 to be inserted by flexing the mounting apparatus. In this embodiment, the mounting apparatus 26 is flexed or bowed, and the display screen 28 is attached to the mounting apparatus 26 by sliding the display screen 28 along the X axis, between the overhangs 38 and the connecting members 46, as illustrated in FIGS. 1 and 6. When the display screen 28 is fully inserted into the mounting apparatus 26, the mounting apparatus 26 is returned to its unflexed shape, capturing the display screen 28. Once the mounting apparatus 26 is returned to its unflexed shape, further motion of the display screen 28 along the X axis is prevented by the connecting sidewalls 48, further motion of the display screen 28 along the Y axis is prevented by the top sidewall 42 and the bottom sidewall 44, and further motion of the display screen 28 along the Z axis is prevented by the overhangs 38 and the connecting members 46. The elastomeric connectors 28 are inserted into connector slots 56 and retained in place by slot bumps 60. The mounting apparatus 26 can then be attached to the printed circuit board 32, allowing the elastomeric connectors 58 to be electrically connected to the printed circuit board 32 and the display screen 28 to be firmly held in place in relation to the printed circuit board 32.

Thus, it is apparent that there has been provided, in accordance with the invention, a mounting apparatus for mounting an electronic component to a printed circuit board that fully provides the advantages set forth above. Although the invention has been described and illustrated with reference to specific illustrative embodiments thereof, it is not intended that the invention be limited to those illustrative embodiments. Those skilled in the art will recognize that variations and modifications can be made without departing from the spirit of the invention.

What is claimed:

1. An apparatus for mounting a display screen to a printed circuit board, the display screen having four edges, the apparatus comprising:
    a top member opposed to a bottom member, the top member and the bottom member each forming an overhang, wherein each overhang is adapted to receive an edge of the display screen;
    a first snap-fit member connected with and extending outwards from the top member;
    a second snap-fit member connected with and extending outwards from the bottom member, wherein the first and second snap-fit members are adapted to connect with the printed circuit board for snap-fit assembly of the mounting apparatus to the printed circuit board.

2. The mounting apparatus of claim 1, wherein the top member forms a top sidewall, wherein the top sidewall abuts against a first edge of the display screen when the display screen is received by the mounting apparatus.

3. The mounting apparatus of claim 1 further comprising a connecting member connected with the top member and the bottom member.

4. The mounting apparatus of claim 1, wherein the printed circuit board forms first and second mating holes for receiving the first and second snap-fit members.

5. The apparatus of claim 1, wherein the top member and the bottom member each have a connector slot, wherein each connector slot is adapted to receive an elastomeric connector.

6. A method for mounting a display screen to a printed circuit board, the method comprising:
  attaching the display screen to the mounting apparatus of claim 1, wherein the edges of the display screen are received by the overhangs; and
  attaching the mounting apparatus the printed circuit board with snap-fit members.

7. The mounting apparatus of claim 2, wherein the bottom member forms a bottom sidewall, wherein the bottom sidewall abuts against a second edge of the display screen when the display screen is received by the mounting apparatus.

8. The mounting apparatus of claim 3, wherein the first and second snap-fit members are each adapted to connect with an edge of the printed circuit board.

9. The mounting apparatus of claim 3, wherein the top member, the bottom member, and the connecting member are all integrally formed as one piece.

10. The mounting apparatus of claim 3, wherein the connecting member forms a connecting sidewall, and wherein the connecting sidewall abuts against a third edge of the display screen when the display screen is received by the mounting apparatus.

11. The mounting apparatus of claim 4, wherein the first snap fit member comprises a flange which extends outwards from the top member and a head connected to the flange, wherein the head has a maximum width which is greater than the width of the first mating hole.

12. The apparatus of claim 5, further comprising an elastomeric connector located in each connector slot.

13. The method of claim 6, wherein the snap fit members are pushed through mating holes formed on the printed circuit board.

14. The method of claim 6, wherein the connecting member forms a connecting sidewall, and wherein the connecting sidewall abuts against a third edge of the display screen when the display screen is attached to the mounting apparatus.

15. An electronic sub-assembly comprising:
  a display screen;
  a printed circuit board;
  a mounting apparatus comprising:
    a top member opposed to a bottom member, the top member and the bottom member each forming an overhang, wherein each overhang receives an edge of the display screen;
    a first snap-fit member connected with and extending outwards from the top member;
    a second snap-fit member connected with and extending outwards from the bottom member, wherein the first and second snap-fit members are connected with the printed circuit board.

16. The electronic sub-assembly of claim 15, wherein the top member and the bottom member are all integrally formed as one piece.

17. The electronic sub-assembly of claim 15, wherein the top member and the bottom member each form a sidewall that abuts against an edge of the display screen.

18. The electronic sub-assembly of claim 15, wherein the top member and the bottom member each form a connector slot, and wherein the electronic display sub-assembly further comprises an elastomeric connector located in each connector slot.

19. The electronic sub-assembly of claim 15, wherein the display screen is a liquid crystal display screen.

20. The electronic sub-assembly of claim 15, wherein the printed circuit board forms first and second mating holes for receiving the first and second snap-fit members.

* * * * *